G. C. KALBFLEISCH.
WARE MOLDING APPARATUS.
APPLICATION FILED AUG. 22, 1918.

1,373,891.

Patented Apr. 5, 1921.
5 SHEETS—SHEET 1.

Inventor
Geo. C. Kalbfleisch

By Geo. E. Kirk
Attorney

G. C. KALBFLEISCH.
WARE MOLDING APPARATUS.
APPLICATION FILED AUG. 22, 1918.
1,373,891.
Patented Apr. 5, 1921.
5 SHEETS—SHEET 2.
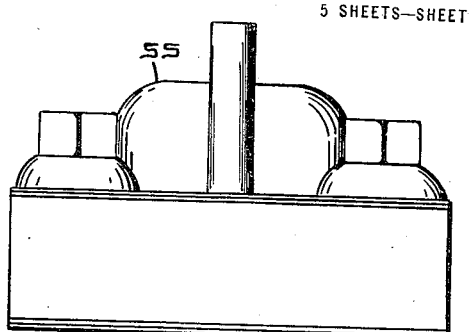
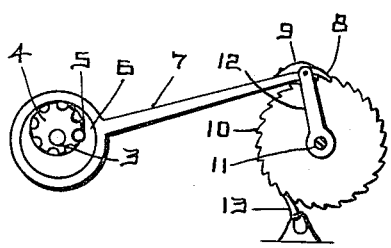
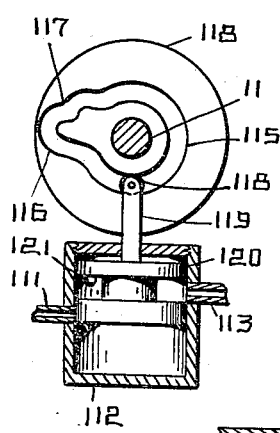
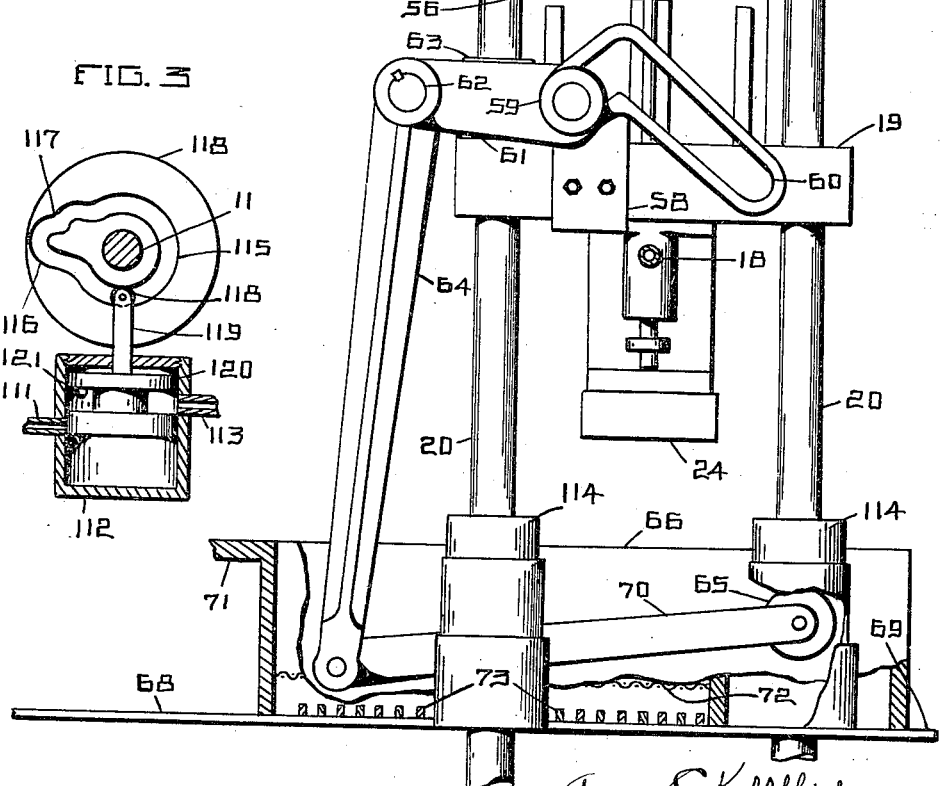
George C. Kalbfleisch, Inventor
By Geo Ruk, Attorney G. C. KALBFLEISCH.
WARE MOLDING APPARATUS.
APPLICATION FILED AUG. 22, 1918.
1,373,891.
Patented Apr. 5, 1921.
5 SHEETS—SHEET 3.
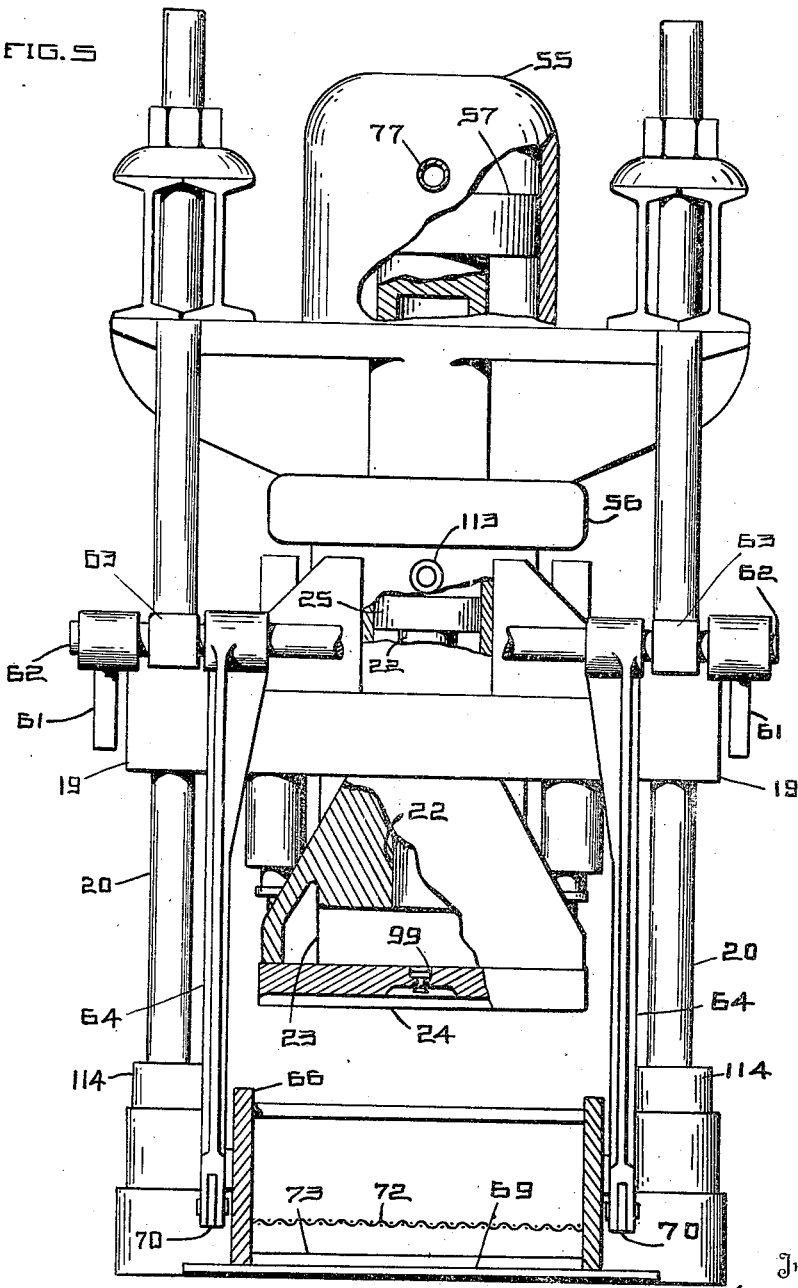

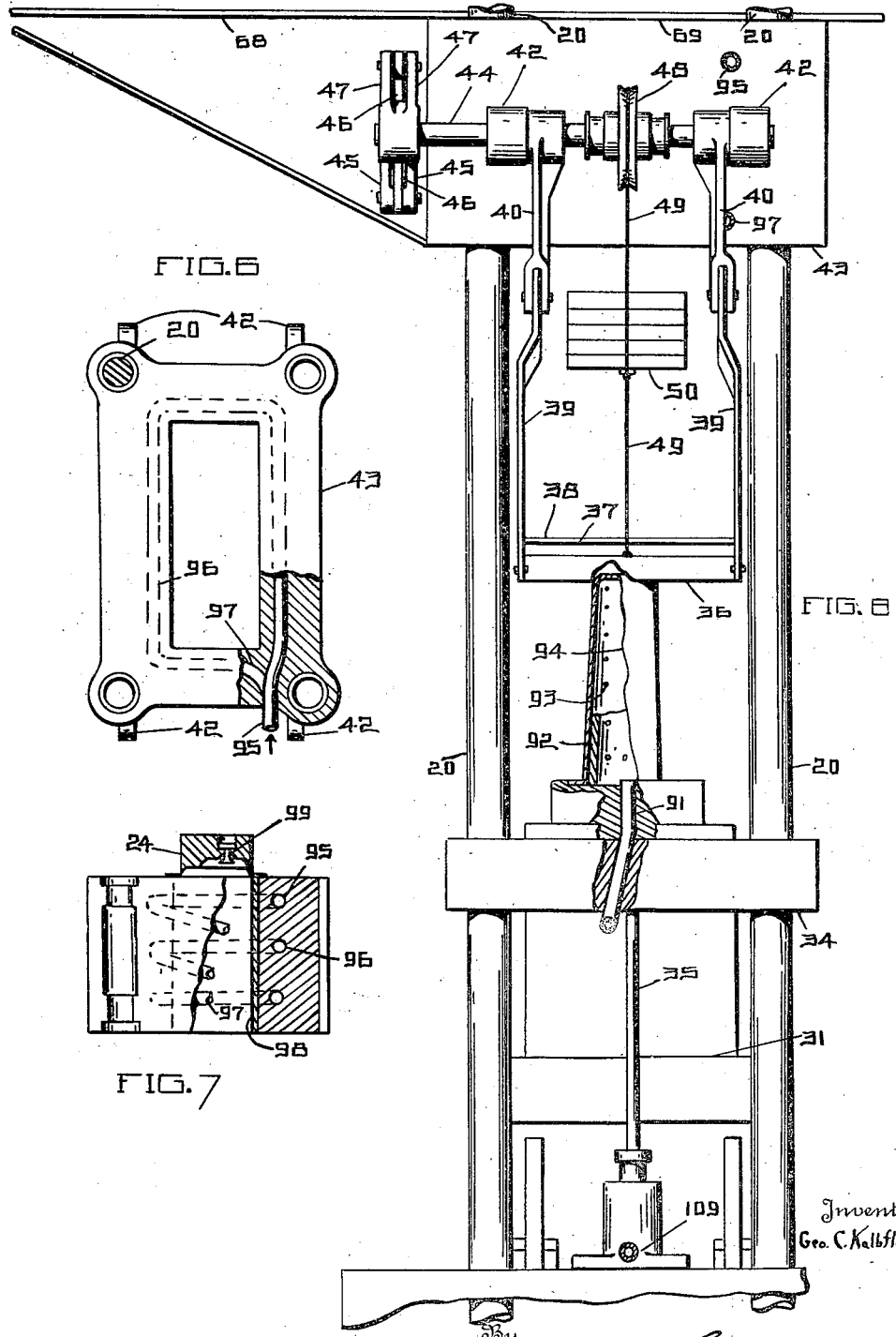

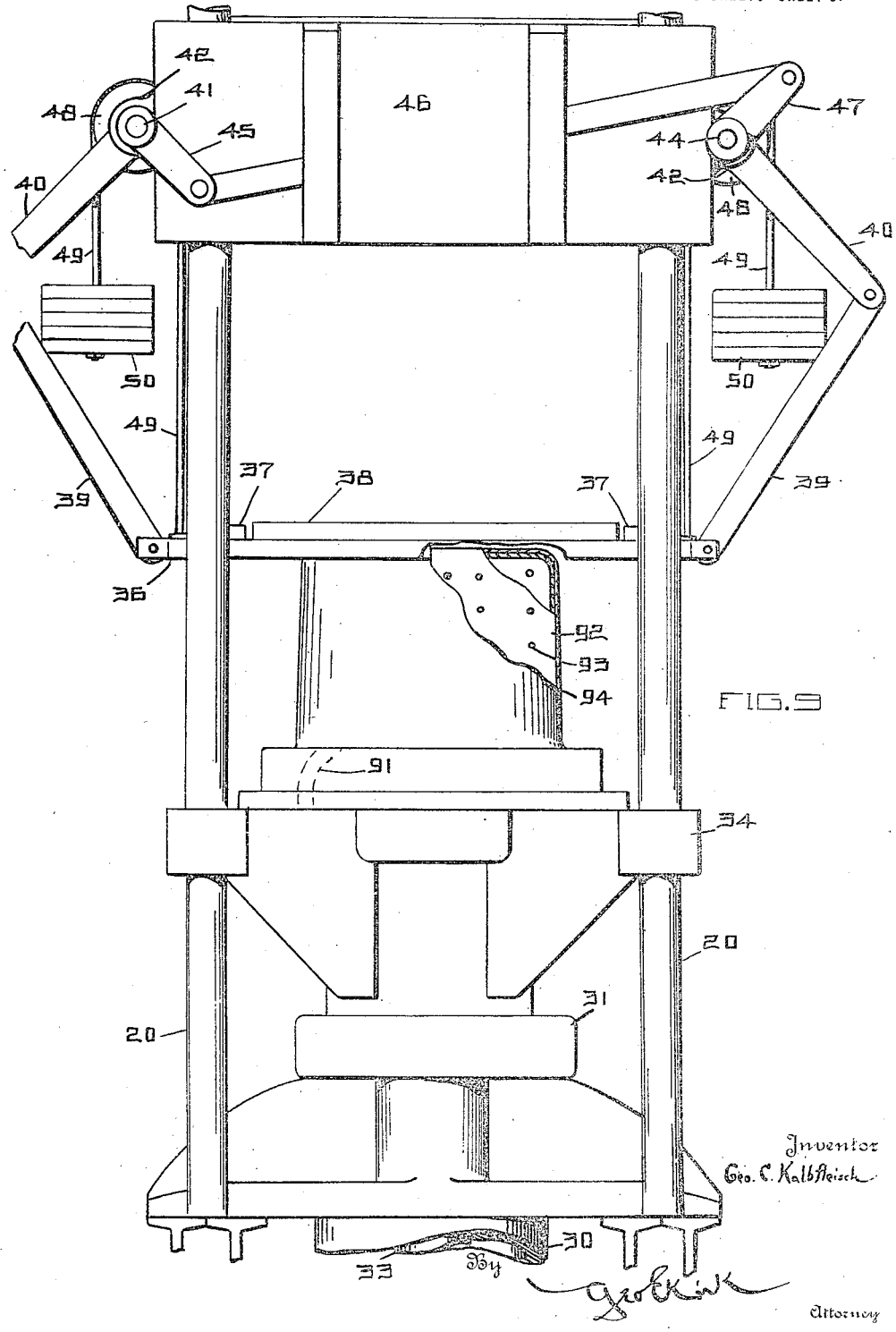

UNITED STATES PATENT OFFICE.

GEORGE C. KALBFLEISCH, OF TIFFIN, OHIO, ASSIGNOR TO STANDARD SANITARY MANUFACTURING COMPANY, OF PITTSBURGH, PENNSYLVANIA, A CORPORATION OF NEW JERSEY.

WARE-MOLDING APPARATUS.

1,373,891.      Specification of Letters Patent.      Patented Apr. 5, 1921.

Application filed August 22, 1918. Serial No. 251,026.

*To all whom it may concern:*

Be it known that I, GEORGE C. KALBFLEISCH, a citizen of the United States of America, residing at Tiffin, Seneca county, Ohio, have invented new and useful Ware-Molding Apparatus, of which the following is a specification.

This invention relates to mechanism for forming material.

This invention has utility when incorporated in apparatus for pressing ware, as in pottery manufacture, with control for determining the sequence and timing of the operations.

Referring to the drawings:

Fig. 2 is a section on the line II—II, Fig. 1, looking in the direction of the arrow, showing the adjustable one direction drive for the control;

Fig. 3 is a section on the line III—III, Fig. 1, looking in the direction of the arrow, showing a control valve;

Fig. 4 is a side elevation on an enlarged scale of the upper portion of the press or apparatus of Fig. 1;

Fig. 5 is a view from the left of the apparatus as appearing in Fig. 4; Figs. 4 and 5, showing the upper plunger raised, instead of lowered as appearing in Fig. 1;

Fig. 6 is a plan view, with a portion broken away, of the mold box or outer member of the mold;

Fig. 7 is an end elevation of the mold of Fig. 6, a portion being broken away, while the upper or closure member of the mold is shown in section in position thereover;

Fig. 8 is a side elevation, on an enlarged scale from Fig. 1, of the mold and lower portion of the apparatus, with the lower or core plunger withdrawn from the mold, instead of therein as in Fig. 1, parts being broken away; and Fig. 9 is a view from the left, of the portion of the apparatus shown in Fig. 8, portions being broken away.

Figure 1:
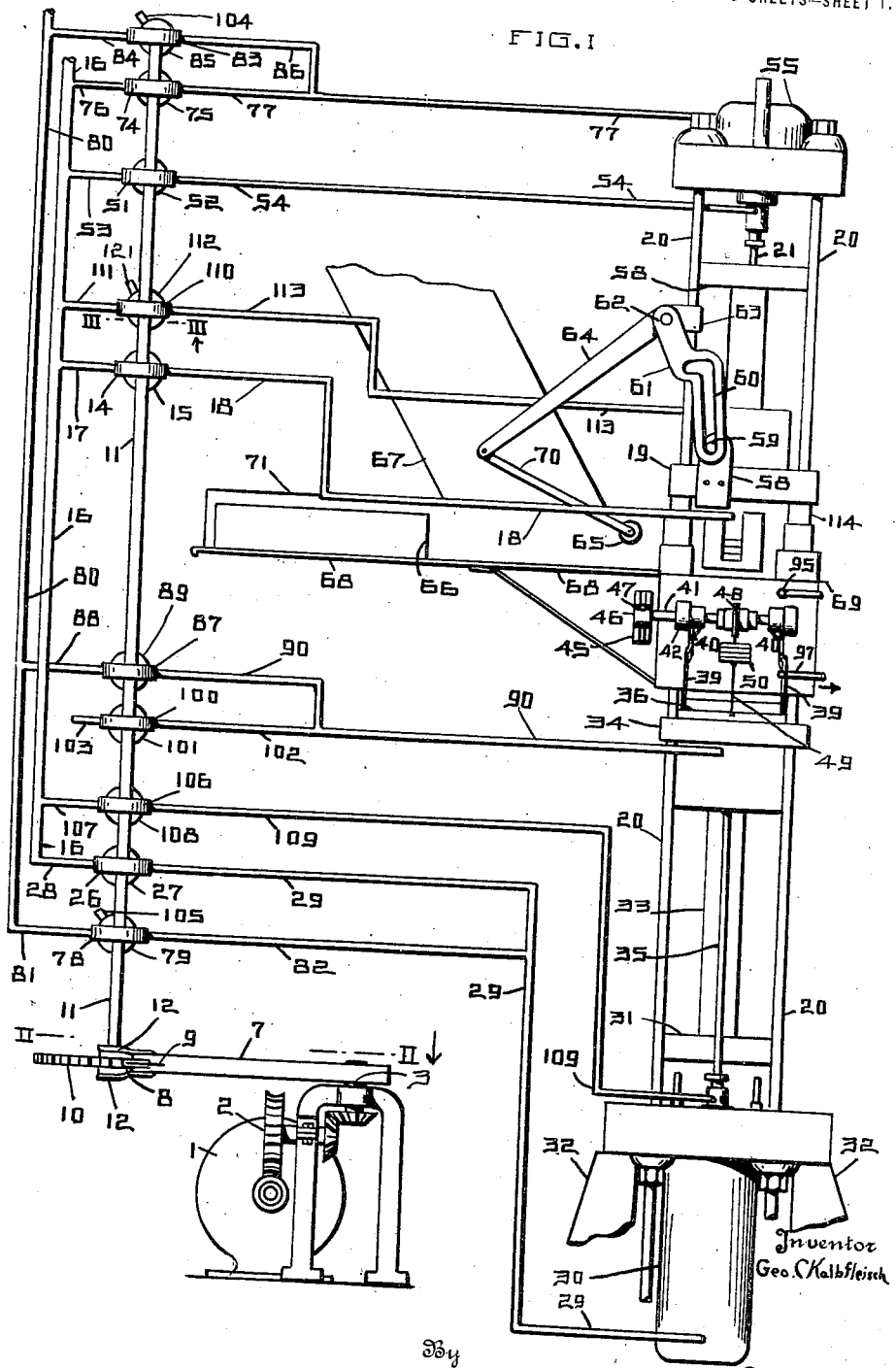
Figure 1 is a side elevation of an embodiment of the invention in an automatic press apparatus for forming pottery.

For a maximum of utility, especially for expeditiously producing uniform output of high grade ware with unskilled labor, the sequence of operations may be definitely timed and automatically actuated from a power source. As an instance thereof, there is shown (Fig. 1) an electric motor 1, having worm speed reduction gearing 2 for actuating shaft 3 (Fig. 2), provided with a primary eccentric 4 and a pin 5 for adjustably mounting thereon auxiliary eccentric 6. There is thus provided a range of throw adjustment for connecting rod 7 carrying pawl 8 normally held by a spring 9 in engagement with ratchet wheel 10 on shaft 11. The connecting rod 7 is confined in its travel to swing about the shaft 11 by the loose arms 12. Pawl 13 engaging the ratchet wheel 10 precludes any reverse travel of the shaft 11. Accordingly with the worm speed reduction, and the adjustable throw intermittent grip device, there may be obtained by adjustment variations of insured one-direction travel over a considerable slow range for the shaft 11.

While not contemplating limiting the invention or apparatus to the form of mold or for producing the identical ware shown, for illustrative purposes, there is shown adaptation for producing vessels of the type for low-down flush tanks. There may be variation of the timing on account of character of the raw material, pressure used, temperatures used, thickness of ware, as well as finish or texture of the product, but as a basis, it may be considered the cycle for a complete set of operations which has a duration of say three minutes. Under such circumstances the shaft 11 has its drive adjusted to rotate one complete turn in three minutes. In the adaptation of the invention for hydraulic operation, the shaft 11 conveniently is interconnected with valves determining the sequence, timing and entire automatic control hereunder.

The showing in Fig. 1 may be considered that in which the material is in the mold and being pressed to form. The formed material in its ejection from the mold and withdrawal from the apparatus leaves the apparatus upper members in the position shown in Fig. 1, with the lower members in the position shown in Figs. 8, 9. With this the stage is set for starting a new cycle:

Operation 1: Grooved cam 14 on the shaft 11 is in position for opening valve 15 so that flow of low pressure liquid from power main 16 may be by branch 17 through said valve 15 and thence by line 18 to movable plunger 19. The plunger 19 embraces each of four strain rods 20 of the press, and is further directed in its reciprocations by guide rods 21. The opening of the valve 15 permits water flow through the flexible line 18 to the under side of piston 25 on the secondary plunger 22, lifting the head 23 and mold closure member or upper platen 24 into position at upper travel limit in the lowered plunger 19.

Operation 2: Grooved cam 26 on the shaft 11 is in position to open valve 27 for power water flow from the main 16 by branch 28, through this valve 27 and thence by line 29 to the lower portion of pressure cylinder 30 mounted by head 31 in position as to the strain rods 20 as sustained by the foundation piers 32. Plunger 33 is thus moved upward out of the cylinder 30 to carry upward head 34 from the position shown in Figs. 8, 9, to the position shown in Fig. 1. However, the incompressible power liquid is retained in the cylinder 30 for maintaining these parts in their thrown or lifted position. The valve 15 is similarly controlled by the cam 14.

The head 34 in its travel along the strain rods 20 is further guided by rods 35, (Fig. 8), similar to the rods 21 (Fig. 4) for the plunger 19.

In this movement upward the plunger head 34, midway of its travel, comes into engagement with a movable frame 36 having guides 37 so it may have readily inserted thereon and removed therefrom a ware receiving pallet 38. During this operation, the pallet 38 is not in position on the frame 36. The frame 36 is counterweighted and mounted to travel horizontally, for at each corner upwardly extends a link 39. Each link 39 is connected to a downwardly and outwardly extending arm 40. One pair of the arms 40 is fast on a shaft 41 mounted in bearings 42 on mold 43 carried by the strain rods 20 of the press. The other pair of arms 40 is fast on a shaft 44 mounted in bearings 42 on the mold 43 oppositely from the shaft 41 but parallel thereto (Figs. 1, 8, 9). On the shaft 41 and fast therewith is arm 45 connected by link 46 to arm 47 fast on the shaft 44. On each shaft 41, 44, is loosely mounted a pulley 48 about which extends a cable 49 from the frame 36 to counterweight 50, which may be adjusted as desired, even for slowing up the downward travel of ware from the mold. However, when approximating balance for the unloaded pallet 38, the ware does not have an injurious travel rate. When the counterweights 50 overbalance the frame 36, removal of the pallet 38 therefrom, permits counterweight recovery or lifting of the frame 36. The head 34 insures the full upward limit of this travel.

Operation 3: The shaft 11 has now rotated to a position bringing cam 51 thereon to open valve 52, so that power water from the main 16 may pass by way of branch 53 and this valve 52 through line 54 to upper cylinder 55 mounted by head 56 in position as to the strain rods 20 in opposition to the lower head 31. This inlet for the line 54 into the cylinder 55 is below the piston 57 (Fig. 5) and is effective for raising the plunger 19 into position adjacent the head 56.

Carried by the plunger 19 is a bracket 58 (Figs. 1, 4) mounting a roller pin 59 disposed in angle guide slot 60 in the free end portion of arm 61 upon opposite sides of the apparatus. Each arm 61 is fast upon shaft 62 carried by brackets 63 (Fig. 5) mounted on two of the strain rods 20 adjacent the upper limit of travel of the plunger 19. On the opposite or inner side of each bracket 63 from the arms 61, there is fast upon the shaft 62 a downwardly extending arm 64 having a horizontally extending link projecting toward the apparatus to pivot bearings 65 in the material supply box 66. With the plunger 19 down (Fig. 1), the box 66 is in its extreme position out from the apparatus, but in supply receiving position under the hopper 67. Platform 68 with guide extensions 69 into the apparatus, sustain the box 66 in its travel, which, as the plunger 19 moves upward, is into the apparatus to arrive in position over the mold 43 as soon as the plunger 19 with the member 24 has sufficient clearance therefor.

This travel of the box 66 is effected by the roller pins 59 coacting with the guide slots 60, rocking the arms 61 upward, thus through the shaft 62 and arms 64 causing the links 70 to actuate the box 66 along the platform 68 and extensions 69 into position over the mold 43. Rear extension 71 in the plane of the top of the box 66 provides an automatic closure for the hopper 67 as the box 66 moves therefrom. The box 66 (Fig. 4) is provided with a screen 72 for sifting the supplied material from the hopper 67, in order that such material may be uniformly subdivided in passing to the mold 43, while transverse bars 73 carried below the screen 72 by the box 66, further assist in distributing the supplied material throughout the mold 43, as they scrape along thereover in the inward and outward travel of the box 66. As the platform 68 and extensions therefrom 69 are continuous except for the mold 43, the material may not escape from the perforate bottom of the box 66 except into the mold 43. The elements present in the supply material may be definitely determined, as well as its physical condition and degree of dryness, so that there may be a uniformity in the grade of output resulting from the measured supply delivered by the box 66 to the mold 43.

Operation 4: The further rotation of the shaft 11 not only positions the valve 52 for exhausting the power liquid from the under side of the piston 57, but through grooved cam 74 opens valve 75 so that power liquid from the main 16 (Fig. 1) may pass by way of branch 76 through the valve 75 and thence by line 77 to the upper end of the cylinder 55 (Figs. 1, 4, 5), thus reversing the travel of the plunger 19 from that of "Operation 3." The angular or offset portion of the guide slot 60 in which the pin 59 is disposed in Fig. 4, serves at the starting of downward travel of the plunger 19, to remove quickly the box 66 from position under the plunger 19 in the apparatus. This quick travel movement of the box insures its clearance from the plunger 19, as well as imparts a sifting action in distributing the supplied material from the box 66 into the mold 43. This travel of the plunger 19 is the first pressing operation in giving initial outward form to the ware.

Operation 5: The travel operations are shown as connected up to power main 16 for quick delivery of a considerable volume of liquid. However, with the parts in position, the final or supplemental forming pressures are then applied herein with efficiency in time and power. The shaft 11 has now come into position to bring grooved cam 78 to open valve 79 from high pressure main 80 by branch 81, for power liquid flow past the valve 79 and by line 82 into the line 29 and thence to the lower end of the lower cylinder 30, the head 34 of which is in the lifted position. Inasmuch as the head 34 is at the limit of its upward travel, this power fluid from the main 80, instead of being a flow, is merely an application of a holding pressure. The area of the piston in the cylinder 30 is such that it exceeds the effective component of final pressure or pressures in the mold 43 which may tend to oppose the maintenance of the head 34 in the lifted position. Accordingly this holding pressure from the main 80 is a lock in its effectiveness for keeping the lower side of the mold 43 closed.

Operation 6: Next in sequence the shaft 11 so positions grooved cam 83 (Fig. 1) so that high pressure motive fluid may be effective from the main 80 through branch 84, valve 85 and line 86 to the line 77, thus applying a holding pressure in the cylinder 55 above the piston 57. As is the case with the cylinder 30, the area of the piston 57 is greater than the upward pressure components from the member 24 of the mold, and the holding of the member 24 is thus positive.

Operation 7: With the upper and lower closures for the mold 43 thus positively held, the shaft 11 now positions grooved cam 87 so that high pressure motive fluid from the main 80 may flow by branch 88 through valve 89 and line 90 into the movable head 34. This line 90 leads from the head 34 upward through duct 91 into hollow upwardly projecting core 92 mounted on the head 34 to extend into the mold 43, in order that the material distributed in the mold 43 by the box 66 may fall thereabout and be slightly pressed to form by the plunger 19 in its travel to mold closing position. This rigid core 92 has openings 93 through its walls for general flow of the fluid therethrough about the core 92 into the enveloping jacket or heavy rubber or gutta percha bag 94 which extends as a seamless continuous member over and about the upwardly projecting core 92 and is firmly anchored and sealed in its connection to the head 34. This yieldable bag 94 about the rigid core 92 is distended by the high pressure fluid from the main 80, and when so distended has its movement from the rigid core 92 approximately uniform in all directions for positively compacting the more or less dry finely subdivided material supplied into the mold 43. The positive closure holding of the mold top and bottom precludes any blow-out, notwithstanding the great pressure applied, which pressure may be varied according to the ware and material, as well as time interval for the pressure holding. This compacting may reduce the volume of the initially formed ware walls from one half to one third, thus imparting such rigidity to this green formed ware that it does not readily crumble or lose its shape if handled with reasonable care. There seem to be sufficient leakages at the mold closures 24, 34, to allow of expressing of entrained air from the material.

The mold 43 (Figs. 6, 7,) has bearings for the four strain rods 20. To avoid sticking of the formed material in the mold, which mold may have some slight draft downward, circulation of a heating medium, as hot water or steam through the mold 43 may be effected by duct 95 to coils 96 and from thence by line 97. This heating has a tendency to cause a sweating or accumulation of moisture upon the walls of the bushing 98 in the mold 43, thus automatically working against any tendency of the high pressure formed ware from adhering therein. Gravity unseating check valve 99 (Figs. 5, 7) in the mold member 24 allows air to enter above the ware so there may be freedom from suction holding or retaining the formed ware, thus further freeing the ware for ready removal from the mold.

There may be short timing between the initiating of these three high pressure operations but the duration thereof may be extended as found desirable.

Operation 8: The shaft 11, after the lapse of the desired time interval, closes the valve 89 to the extensible bag 94, and through grooved cam 100, opens valve 101 (Fig. 1) so that the liquid in the bag 94 may flow therefrom by way of the line 90 and line 102 through the valve 101 to exhaust line 103. This deflation of the bag 94 in collapsing or taking up its stretch by coming back upon the rigid core 92, frees the central or interior wall forming means from the press-formed ware.

Operation 9: The cam 83 has now so positioned the valve 85 to cut off from the pressure supplying branch 84, and further connects up line 77 through the line 86 with exhaust 104, so that besides relieving the cylinder 55 from the pressure above the piston 57, upward travel of such piston may now occur.

Operation 10: The cam 78 now shifts the valve 79 for analogous operations as to the cylinder 30 to those occurring in "Operation 9" as to the cylinder 55. With this valve 79 shutting off the high pressure line 80 from communication with the lower cylinder 30, it also places the lines 29, 82 in communication with exhaust 105, so that the head 34 may be free for lowering the core from the mold 43.

Operation 11: The shaft 11 has now brought cam 106 (Fig. 1) so that lower pressure motive liquid from the main 16 may pass by branch 107 and valve 108 to line 109 extending to the upper end of the lower cylinder 30. This motive fluid for volume delivery in effecting travel by entering the upper end of the cylinder 30, moves the plunger 33 down thereinto and thus serves to lower the head 34 for withdrawing the core 92 with the bag 94 thereover from within the mold 43. As the core is withdrawn sufficiently to clear the mold 43, the pallet 38 is moved thereover as guided by the strips 37 of the frame 36. This insertion of the pallet 38 should occur close up to the underside of the mold 43 to be in position for sustaining the ware above the removed core 92.

Operation 12: The final or last position in this continuous rotation or travel sequence as automatically controlled by the shaft 11 places grooved cam 110 (Figs. 1, 3) in position so lower pressure fluid from the main 16 may flow by branch 111, through valve 112 and line 113 (Fig. 5) to the upper side of ejector piston 25 in the plunger 19, thus acting through the stem 22 and the head 23 to force the head 24 slightly into the mold beyond the stop distance of travel as determined by the plunger 19 abutting the collars 114 on the strain rods 20. The plunger 19 has been lowered to abut the collars 114 in "Operation 4." This movement of the head 24 into the mold 43 loosens the formed ware so it slides freely from the heated moist walls of the mold bushing 98 to be sustained upon the pallet 38. The added weight of this ware upon the counterweighted platform 36, causes a lowering thereof, the speed of which lowering may be limited by the lowering of the core 92 thereunder, so no rough handling or concussion may shatter the green ware. When the ware is lowered to clear the mold 43, the pallet 38 with the ware thereon is removed from the apparatus. This taking of the load from the frame 36 may allow the frame to rise automatically from the action of the counterweights 50, if the frame 36 has been so over-counterweighted as to slow up the ejection travel of the ware materially.

As illustrative of the general valve control, that for the valve 112, may be discussed (Fig. 3). The cam 114 has endless groove thereon provided with short radius portion 115 with a long radius portion 116 and an intermediate radius portion 117. Coacting with the groove is roller 118 on stem 119 extending to annular grooved piston 120 in the valve 112. In the short radius 115, roller 118 brings the piston 120 so there is communication from the line 113 with exhaust 121, thus permitting a recovery or upward travel of the member 24, while the groove portion 116 is the position for short period power fluid flow, with a brief holding thereof by the portion 117.

With the shaft 11 driven continuously at a uniform rate, the apparatus is now in position for automatic repetition of the cycle of operations in taking a measured supply of raw or finely divided material and shaping such into pressed-to-form ware. Briefly stated, the piston 25 moves upward to withdraw the member 24 from the mold 43 into position against the plunger 19. The groove on the cam 14 provides the exhaust position of the valve 15 until after the occasion for holding the member 24 in position against the plunger 19 has passed, or say so exhausting may occur at "Operation 4," simultaneously with exhaust through the valve 52. The lower head 34 with the core 92 and bag 94 thereover is next in position to form the lower closure for the mold 43, and this is followed by the upper plunger 19 coming down to place the member 24 in position completing the closure of the mold, after this plunger has first been run up to operate the box 66 for distributing the finely divided material in and filling the mold 43 about the core therein. The recover or downward travel of the plunger 19 effects removal of the box 66. Final forming holding pressures are then applied to the lower and upper mold closure members, with the final forming pressure given to the material in such closed mold, through the bag 94 being expanded therein.

The ware thus formed, has the bag 94 deflated so the core may be removed readily, the high or holding pressures are taken off the upper and lower mold closures, followed by recession of the lower closure to withdraw the core from the mold, to a position where the pallet 38 may be inserted below the ware still adhering to the mold 43, while the valve 112 ejects the ware from the mold by a slight movement of the member 24 thereinto. The valve 108 may then serve to lower the tray sustained ware and when lowered, such valve 108 be positioned for exhaust, and the cycle of operations again proceed.

What is claimed and is desired to secure by Letters Patent is:

1. In the manufacture of ware, supply means for unformed material, control means coacting with the supply means for measuring the material movable away from the supply means, a mold, and means effecting distribution of said measured supply of unformed material into the mold, means for closing the mold and pressing the material to form therein, means for giving the material in the mold a supplementary pressure, and means for removing the formed material from the mold.

2. In the manufacture of ware, mold apparatus comprising movable means for applying a preliminary pressure to one wall face of the material and additional relatively movable means for applying a supplemental pressure to another wall face of said material.

3. A pottery forming machine comprising a frame, a mold having side walls fixed with said frame, means for shifting a supply of material into the frame over the side wall portion of the mold, a mold end movable from above to force the material into the side wall portion of the mold, a mold end movable downward from below said side walls to permit removal of the formed material from below the side walls, and control means for the mold ends in sequence.

4. A pottery forming machine comprising a frame, a mold having side walls fixed with said frame, delivery mechanism having means for sifting a supply of unformed material into the frame over the side wall portion of the mold, a mold end movable from above to force the sifted material into the side wall portion of the mold, a mold end movable downward from below said side walls to permit bottom removal of the formed material from the side walls with the other end still coacting with the mold side walls, and control means for the mold ends in sequence.

5. A pottery forming machine comprising a mold having a supply side for unformed material and remote therefrom a delivery side for formed ware, a core disposed in said mold from one of said sides, an elastic jacket for the core, and means for distending said elastic jacket.

6. A pottery forming machine comprising a mold having an unformed material supply side, an opposing formed ware delivery side, an elastic jacketed core disposed in said mold from said delivery side, and means for distending said core.

7. A pottery forming machine comprising a mold fixed against lateral movement and having opposite supply and discharge sides, opposing plungers for closing said sides and automatic sequence determining power means for actuating each of said plungers.

8. A pottery forming machine comprising a mold fixed against lateral movement and having an upper supply side and a lower discharge side, plungers for closing said sides, driving means for moving the supply side plunger to eject formed ware from the mold and control means for the discharge side plunger for lowering the ejected formed ware from the mold.

9. In the production of pressure formed ware, fluid pressure positioned apparatus for bringing material for the ware to initial form, with the apparatus assembled and additional increased pressure means coacting as to the still assembled apparatus for further compacting the material toward finished ware form.

10. A pottery forming machine comprising a mold, hydraulic means for applying an initial forming pressure to material in the closed mold, and means for increasing the pressure upon the material in the still closed mold for further compacting the material toward finished ware form.

11. A pottery forming machine comprising a sectional mold, driving means for bringing the mold into assembled closed position, control means effecting automatic holding of the mold in closed position, and pressure applying means coacting while the mold is still closed for forming ware in the closed mold.

12. A pottery forming machine comprising a mold, closure means for the mold, actuating means for bringing the closure means into assembled position as to the mold, pressure means for maintaining the closure means in assembled position, and ware forming pressure means for operating upon material in the mold during the holding of the closure means assembled with the mold by the pressure means.

13. A pottery forming machine comprising a mold, a closure member for the mold, a drive device for the machine, pressure means controlled by the drive device for bringing the closure member into assembled position as to the mold, increased pressure means for holding the member in assembled position for the mold, and ware forming pressure means controlled by the drive device for compacting the material into form in the assembled mold.

14. A pottery forming machine comprising a sectional mold, a drive device having power means provided with connections from the means to the mold for effecting assembly of the mold, control means for effecting power means actuation in sequence in supplying material to the mold, closing the mold, compacting the mold held material to ware form and effecting bottom discharge of the formed material, and means for varying the timing of such sequence.

15. An automatic machine for forming pottery comprising a press provided with opposing plungers, a mold intermediate the plungers to be closed thereby, actuating means for the plungers, pressure increasing means for holding the plungers in mold closing position, means for applying compacting pressure in the mold to bring the material therein to ware form, a drive device controlling said means in sequence for forming the ware and opening the mold, and a ware support movable with a plunger in removing formed ware from the mold.

16. A pottery forming machine comprising a mold, means mounting the mold against horizontal movement, supply means for delivering material to be formed into the top of the mold, a bottom mold section movable downward away from the mold, a top mold section for closing the mold, and actuating means for moving the top mold section down into the mold after the bottom mold section is moved from the mold for loosening formed ware from the mold.

17. A pottery forming machine comprising a mold, means mounting the mold against horizontal movement, supply means for delivering material to be formed into the top of the mold, a bottom mold section movable downward away from the mold, a top mold section for closing the mold, actuating means for moving the top mold section down into the mold after the bottom mold section is moved from the mold for loosening formed ware from the mold, and ware receiving means for sustaining the formed ware as ejected from the mold.

18. A pottery forming machine comprising a frame, a mold having side walls fixed in said frame, upper and lower mold portions, actuating means for press-forming material in said mold by controlling said mold portions, release means for permitting a downward movement of the lower mold portion after press forming of ware in the mold, and frame directed carrying means for formed ware coacting between the lower mold portion and the mold side walls during withdrawal of the lower mold portion.

19. A pottery forming machine comprising a mold, a receptacle for handling a charge of unformed material to the mold, said receptacle being provided with parallel bars disposed adjacent the mold top, and a drive device for actuating the receptacle over and away from the mold for distributing material into the mold as assisted by said bars.

20. A pottery forming machine comprising a mold, means mounting the mold against horizontal movement, supply means for delivering material to be formed into the top of the mold, a bottom mold section movable downward away from the mold, a top mold section for closing the mold, actuating means for moving the top mold section down into the mold after the bottom mold section is moved from the mold for loosening formed ware from the mold, and a counterweighted support for lowering the formed ware ejected from the mold out of the mold over the withdrawn bottom mold section.

21. A pressed ware forming machine comprising a mold, strain rods extending parallel to each other through the mold, and mold closure means oppositely mounted on the strain rods and guided thereby in movement toward and from mold closing position.

22. A pottery forming machine comprising a frame, a mold in said frame having side walls fixed with the frame, an upper end movable toward the side walls to force material into the mold for forming into ware, a lower mold end movable away from the side walls to permit discharge of formed ware, and control means for actuating said ends in sequence including means for shifting the upper end downward as to the side walls as the lower end is being withdrawn to free the ware from the side walls.

23. A pottery forming machine comprising a frame, a mold having side walls fixed with said frame, an upper mold section movable toward the side walls to force material into the mold for forming into ware, a lower mold section movable downward from the side walls to permit discharge of formed ware from the mold, a pallet disposed between the lower mold section and the mold side walls and coacting in the descent of the lower section to receive the formed ware, and pallet travel resisting means for slowing up the downward movement of the ware on the pallet.

24. A pottery forming machine comprising a mold provided with a downwardly movable section, and a counterweighted pallet supporting device for receiving ware from the mold above said withdrawn downwardly movable section.

25. A pottery forming machine comprising a mold, a bottom closure for the mold, a pallet support, downward travel retarding means for the support, and a pallet to be positioned on the support over the closure for travel away from the mold in carrying ware therefrom.

26. A pottery forming machine comprising a frame, a mold having side walls fixed with said frame, an upper and a lower mold section movable relatively to the side walls for permitting supply of material from above and discharge of formed ware from below the side walls, means for actuating the sections to press-form material into ware in the mold, including means for withdrawing the lower section from the mold side walls and causing movement of the upper section to free the ware in the mold to follow the lower section, and a pallet guided by the frame for receiving the ware.

27. An automatic machine for forming pottery comprising a press, provided with opposing plungers, a mold intermediate the plungers to be closed thereby, hydraulic actuating means for the plungers, hydraulic pressure increasing means for holding the plungers in mold closing position, means for applying hydraulic compacting pressure in the mold to bring the material therein to ware form, a drive device controlling said means in sequence for forming the ware and opening the mold, and a ware support movable with a plunger in removing formed ware from the mold.

In witness whereof I affix my signature.

GEORGE C. KALBFLEISCH.